Patented June 20, 1950

2,511,911

UNITED STATES PATENT OFFICE 2,511,911

PROCESS OF PREPARING FLAMEPROOFING GLYCOL MONOSULFATES

Walter M. Fuchs, New York, N. Y., and Eskil Gavatin, Stockholm, Sweden; said Gavatin assignor to said Fuchs No Drawing. Application January 5, 1949, Serial No. 69,408

7 Claims. (Cl. 260—458)

This invention pertains to the manufacture of glycol monosulfates for use as flameproofing agents, especially in the manufacture of flameproof paper.

One of the problems encountered in the production of articles manufactured from paper is that of so treating the paper that it will initially possess and continue to retain a degree of flexibility and softness sufficient to allow it to be hung or draped, for example, to be used for the draping of walls or windows. For these purposes the paper must not only possess the physical characteristics just mentioned, but additionally it is extremely desirable that such paper articles be possessed of a high degree of resistance to combustion. This last property is usually referred to as being flameproof, this term not being interpreted as denoting absolute incombustibility but merely a degree of resistance to the influence of heat sufficiently great so that the material will not function as an incendiary supporter. It is furthermore desirable that the physical and chemical properties just mentioned be maintained for a considerable period of time and irrespective of exposure of the paper article to temperatures and humidities fluctuating between the limits ordinarily encountered in habitations of factories. It is an object of the invention to provide an economical and convenient process for preparing flameproofing glycol monosulfates for use in the treatment of paper to secure in the finished articles the desired characteristics above set forth.

As disclosed in application Serial No. 750,630, filed May 26, 1947, now abandoned, of which this application is a continuation in part, it has been found that an aqueous solution of a suitable salt of a suitable monosulfated glycol forms a convenient basic material useful in the treatment of paper.

In order to have flameproofing characteristics, an organic compound must be capable of dehydration in such manner that the main products of dehydration are carbon and water. Acids such as sulfuric or phosphoric acid are known to bring about dehydration of this type especially with carbohydrates, a class of compounds which have received this name because on the basis of their formula they may give upon dehydration essentially carbon and water.

It has been found that glycol monosulfates may be used as convenient and inexpensive flameproofing agents if they show a ratio of carbon to hydroxyl between 1 and 2. For example, in ethylene glycol the ratio of carbon to hydroxyl is 1 and in propylene glycol, 1.5. In addition to ethylene and propylene glycol, compounds such as trimethylene glycol, diethylene glycol, and other polyhydroxyl compounds are suitable.

Compounds with hydrocarbon chains of more than two carbon atoms, even if possessed of two hydroxyl groups, and on this basis classificable as glycols, are not representative of the class of compounds claimed in this invention and cannot be used as flameproofing agents because upon heating they will give rise to volatile combustible hydrocarbons.

The higher alcohols and higher glycols used for manufacturing sulfated detergents, differ from the glycols referred to in this application in that they contain a long, lyophobic hydrocarbon chain as essential structural element will not only preclude the sulfated derivative from exerting a flameproofing effect, but will also preclude the application of the manufacturing process disclosed below because this process applies only to glycols soluble in sulfuric acid and water while higher alcohols and higher glycols containing the above mentioned hydrocarbon chain are not soluble in either medium.

It appears further that the salts of glycol monosulfates best suited for flameproofing are those of ammonia and of nitrogen bases with short or hydroxylated alkyl radicals. These salts have apparently heretofore received little attention and in many cases seem to represent new compounds.

The treatment of ethylene glycol with sulfuric acid at elevated temperature in order to sulfate the same has been known for a considerable length of time. In 1859, Simpson (Liebig's Annalen, vol. 112, p. 146) described the preparation of the barium salt of ethylene glycol monosulfate by heating a mixture of ethylene glycol and sulfuric acid to a temperature of 150° C., diluting with water, neutralizing with barium carbonate, filtration and evaporation to crystallization. Apparently, no other salt of the ethylene glycol monosulfate has been described.

A similar process applied to glycerol and requiring a temperature of 110 to 120° C. has been described in U. S. 2,347,031.

The employment of such relatively high temperatures especially when sulfuric acid is present is inconvenient and demands special precautions. Moreover, it has been found experimentally that by heating a mixture of a glycol such as ethylene glycol, propylene glycol, or glycerol, with sulfuric acid to temperature above 100° C. very dark reaction products are obtained which contain condensation and polymerization products, to which of course at the time of the work of Simpson the chemists paid little or no attention. Accordingly, the yield of monomeric products by such processes is low; this is recognized in Beilstein by referring to Simpson's work merely as a method of formation, not of preparation of the glycol monosulfate and its barium salt.

It has been found that it is possible to prepare a glycol monosulfate at a temperature not exceeding 40° C. in excellent yield and without formation of dark colored other products.

For example, ethylene glycol is mixed with sulfuric acid in a mol ratio of approximately 1:1. The two ingredients may be run together from separate storage tanks or the sulfuric acid may be run into the glycol. Since it is important that the reaction should proceed at a rate and under such control that the temperature is preferably kept below 40° C., and since the reaction is exothermic, external cooling means are needed. The two ingredients may be separately led through suitable ducts and combined just as they enter a reactor submerged in a cooling medium, such as water, or cooled in some other way, e. g., by the employment of a blast of air. It is also possible to employ a batch process in which the glycol is placed in a suitable reaction vessel, cooled, e. g., by an internal cooling coil fed with cold running water. The concentrated sulfuric acid is introduced into the glycol at such a rate that the temperature does not exceed 40° C.

The product resulting from reaction as described is then preferably diluted with water, such dilution to be carried out under precautions preventing an undue rise of temperature. The next step in the process is to neutralize the diluted reaction product with an aqueous solution of a suitable base such as ammonia, ethanol amine, ethylene diamine, or the like. Other bases may be used, but it it is highly desirable that some base yielding an ammonium or similar salt be employed for neutralization in order ultimately to secure the desired fire resistant properties as in a paper. Care should always be taken properly to dissipate the heat of neutralization, as by water cooling.

The radicals attached to the nitrogen of suitable amines must be short, or hydroxyl bearing.

While the process just described employs a glycol, it has been found that the substitution of a portion of the glycol, usually less than 10%, by a compound such as ethanol amine may be advantageous for some purposes.

While the process has been above described as taking place in several discrete steps, it has been found possible to combine some of these steps. For example, dilution and neutralization may take place in a single step by using for neutralization a sufficiently weak solution of a base.

The solutions thus obtained may contain 80% or more of the theoretical amount of the respective glycol sulfate. In addition, they contain the excess glycol and a sulfuric acid salt of the base used for neutralization. In some cases, these two compounds will not interfere with the intended use. In some cases, it is possible to obtain a purified glycol monosulfate salt by concentrating the reaction mixture, permitting crystallization of the glycol sulfate and separating it, e. g., from the ammonium sulfate which latter will accumulate in the mother liquor. In some cases, the glycol monosulfate salts give syrups not amenable to crystallization. This applies to the ethanol amine salts of ethylene glycol monosulfate, propylene glycol monosulfate and other similar glycol monosulfates. This is an advantage where it is desired to have a permanently soft agent of impregnation which will not tend to impart a hard hand or to cause stiffening in paper articles under extreme conditions.

While the products above described are primarily useful as flameproofing agents and furthermore as softening agents, they are also useful as swelling agents. In the treatment of paper, the use of these products causes an expansion of the fibers of the paper in a direction substantially transverse to their major axes, so that the paper emerges from the treating process with somewhat greater width than it had before treatment. This presents the advantage that the total wastage, brought about by the necessary trimming of the longitudinal edges of the paper, is greatly reduced.

Examples of practical procedures follow.

*Example 1.*—A 5000 milliliter beaker was equipped with a stirrer and a thermometer and placed into a cold water bath; 620 grams of ethylene glycol were placed into the beaker, and while stirring and maintaining a temperature not exceeding 40° C., 1000 grams concentrated sulfuric acid were introduced through a dropping funnel, the whole operation taking substantially one hour. Then, the mixture was kept at room temperature for another hour, then placed back into the cold water bath and diluted with 1000 milliliters water while stirring and maintaining a temperature not exceeding 40° C. Titration of a sample indicated that reaction had taken place to the extent of giving approximately 85% of the glycol monosulfate. The entire reaction mixture was then neutralized with about 790 milliliters ammonia water of 25% under the same precautions as outlined above, and the added precaution of introducing the aqueous ammonia below the surface of the stirred and cooled reaction mixture.

Upon further concentration of an aliquot of the mixture, ample crystallization of the ammonium salt of ethylene glycol monosulfate was noted. At room temperature a solution of the salt is saturated at a concentration of about 38%.

*Example 2.*—A 5000 milliliter beaker was equipped with a stirrer and a thermometer and placed into a cold water bath; 620 grams of ethylene glycol were placed into the beaker, and while stirring and maintaining a temperature not exceeding 40° C., 1000 grams concentrated sulfuric acid were introduced as described in Example 1. The reaction mixture was finally neutralized with 1400 grams of an aqueous solution of ethanol amine containing 50% of the amine, at a temperature not exceeding 40° C.

Upon further concentration of an aliquot of the mixture, crystallization was not noted and the residue remained syrupy.

*Example 3.*—A 5000 milliliter beaker was equipped with a stirrer and a thermometer and placed into a cold water bath; 620 grams of ethylene glycol were placed into the beaker, and while stirring and maintaining a temperature not exceeding 40° C., 1000 grams concentrated sulfuric acid were introduced as described in Example 1. The reaction mixture was finally neutralized with a cold mixture of 1500 milliliters water, 120 milliliters ammonia water of 25%, and 600 grams ethanol amine, while maintaining a temperature not exceeding 40° C.

Upon further concentration of an aliquot of the mixture, crystallization was not noted and the residue remained syrupy.

*Example 4.*—A 1000 milliliter beaker was equipped with a stirrer and a thermometer and placed into a cold water bath; 76 grams propylene glycol were placed into the beaker, and while stirring and maintaining a temperature not exceeding 40° C., 100 grams concentrated sulfuric acid were introduced through a dropping funnel, the whole operation taking substantially one hour. After some standing at room temperature, the reaction mixture was diluted with 200 milliliters water while stirring and maintaining a temperature not exceeding 40° C. Titration of a sample indicated that reaction had taken place to the extent of giving approximately 86% of the propylene glycol monosulfate. The reaction mixture was neutralized with 80 milliliters ammonia water of 25% under the same precautions as outlined above, and the added precaution of introducing the aqueous ammonia below the surface of the stirred and cooled reaction mixture.

Upon further concentration of an aliquot of the mixture, ample crystallization of the ammonium salt of propylene glycol monosulfate was noted. At room temperature a solution of the salt is saturated at a concentration of about 35%.

What is claimed is:

1. A process of producing, as flameproofing agents, monosulfates of glycols containing from two to six carbon atoms and showing a ratio of carbon to hydroxyl from one to two, by reacting equimolar quantities of glycol and sulfuric acid while keeping the temperature below substantially 40° C., diluting and neutralizing the first reaction product, while keeping the temperature during dilution and neutralization below substantially 40° C.

2. A process according to claim 1, in which the glycol is ethylene glycol.

3. A process according to claim 1, in which the glycol is propylene glycol.

4. A process according to claim 1, in which neutralization is effected by means of a nitrogen base of the general formula $NR_3$ where R represents a member selected from the group consisting of hydrogen, alkyl radicals having not more than two carbon atoms and alkylol radicals having not more than two carbon atoms.

5. A process according to claim 4, in which the nitrogen base is ammonia.

6. A process according to claim 4, in which the nitrogen base is ethanol amine.

7. A process according to claim 1, in which neutralization is effected by a mixture of ammonia and ethanol amine.

WALTER M. FUCHS.
ESKIL GAVATIN.

REFERENCES CITED

The following references are of record in the file of this patent:

UNITED STATES PATENTS

| Number | Name | Date |
|---|---|---|
| 2,091,956 | Benner | Sept. 7, 1937 |
| 2,264,737 | Bertsch | Dec. 2, 1941 |

OTHER REFERENCES

Grun: "Ber. deutsch. chem. Ges.," vol. 38 (1905), page 2285.

Grun: "Ber. deutsch. chem. Ges.," vol. 52 (1919), pp. 260–263.